(12) United States Patent
Gomulka

(10) Patent No.: US 6,865,883 B2
(45) Date of Patent: Mar. 15, 2005

(54) SYSTEM AND METHOD FOR REGENERATING EXHAUST SYSTEM FILTERING AND CATALYST COMPONENTS

(75) Inventor: Ted G. Gomulka, Livonia, MI (US)

(73) Assignee: Detroit Diesel Corporation, Detroit, MI (US)

( * ) Notice: Subject to any disclaimer, the term of this patent is extended or adjusted under 35 U.S.C. 154(b) by 48 days.

(21) Appl. No.: 10/317,458

(22) Filed: Dec. 12, 2002

(65) Prior Publication Data

US 2004/0112045 A1 Jun. 17, 2004

(51) Int. Cl.$^7$ ................................................. F01N 3/00
(52) U.S. Cl. ........................... 60/295; 60/285; 60/277; 60/297; 60/300; 123/339.16
(58) Field of Search ..................... 60/274, 276, 277, 60/284, 285, 286, 300, 301, 311, 295; 123/192.1, 339.16, 339.18

(56) References Cited

U.S. PATENT DOCUMENTS

| | | |
|---|---|---|
| 4,346,557 A | 8/1982 | Shadman et al. |
| 4,424,671 A | 1/1984 | Tokura |
| 4,462,208 A | 7/1984 | Hicks et al. |
| 4,510,749 A * | 4/1985 | Taguchi et al. ............... 60/286 |
| 4,538,411 A | 9/1985 | Wade et al. |
| 4,544,388 A | 10/1985 | Rao et al. |
| 4,562,695 A | 1/1986 | Rao et al. |
| 4,573,317 A | 3/1986 | Ludecke |
| 4,677,823 A | 7/1987 | Hardy |
| 4,720,972 A | 1/1988 | Rao et al. |
| 4,835,963 A | 6/1989 | Hardy |
| 4,835,964 A | 6/1989 | Kume et al. |
| 4,974,414 A | 12/1990 | Kono et al. |
| 5,088,282 A | 2/1992 | Kramb |
| 5,121,601 A | 6/1992 | Kammel |
| 5,123,243 A | 6/1992 | Baddour |
| 5,265,418 A * | 11/1993 | Smith ........................ 60/284 |
| 5,503,804 A * | 4/1996 | Fujishita et al. ............ 422/109 |
| 5,746,989 A * | 5/1998 | Murachi et al. ......... 423/213.7 |
| 5,780,811 A | 7/1998 | Kawamura |
| 5,927,075 A | 7/1999 | Khair |
| 6,013,599 A | 1/2000 | Manson |
| 6,063,150 A | 5/2000 | Peter et al. |
| 6,133,702 A | 10/2000 | Noble et al. |
| 6,161,377 A * | 12/2000 | Boegner et al. ............... 60/274 |
| 6,233,923 B1 * | 5/2001 | Itou et al. ..................... 60/277 |
| 6,248,689 B1 | 6/2001 | Manson |
| 6,381,955 B1 | 5/2002 | Morganti et al. |
| 6,418,713 B1 * | 7/2002 | Gale et al. ..................... 60/284 |
| 6,422,001 B1 * | 7/2002 | Sherman et al. ............... 60/274 |

FOREIGN PATENT DOCUMENTS

DE 39 29 303 A1 3/1991

* cited by examiner

Primary Examiner—Tu M. Nguyen
(74) Attorney, Agent, or Firm—Brooks Kushman P.C.

(57) ABSTRACT

A system and method for regenerating particulate filters, catalyzed soot filters and NOx catalysts for a vehicle having a compression ignition engine. An engine control module controls engine operation and regeneration functions. The engine preferably includes an integrated starter/alternator/flywheel/retarder assembly. A load bank heater is provided in the exhaust system that is activated to directly heat exhaust gases raising the temperature thereof and approaching the temperatures required for regeneration and desulfation. Activation of the heater applies a load through the integrated starter/alternator/flywheel/retarder assembly that increases the load on the engine and in turn further increases the temperature of the exhaust to levels required for regeneration and desulfation.

16 Claims, 1 Drawing Sheet

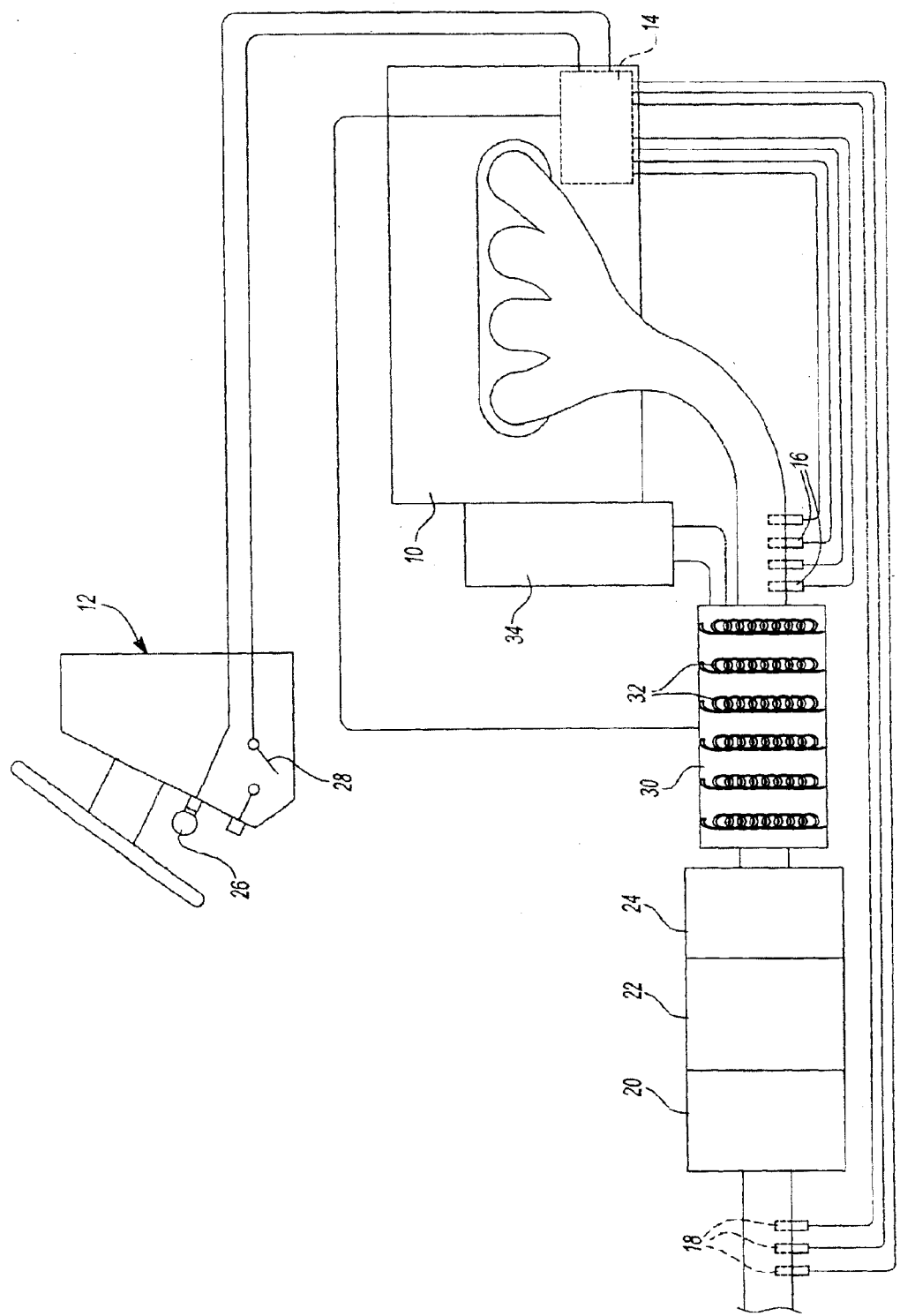

SYSTEM AND METHOD FOR REGENERATING EXHAUST SYSTEM FILTERING AND CATALYST COMPONENTS

BACKGROUND OF THE INVENTION

1. Field of the Invention

The present invention relates to a system and method of regenerating diesel engine exhaust system filters and catalysts.

2. Background Art

Diesel engine exhaust systems include particulate filters, catalyst soot filters, and NOx adsorber catalysts that clean exhaust and reduce engine emissions. There is a need to regenerate and desulfate exhaust system components on a regular basis for efficient operation.

Regeneration of diesel particulate filters requires heating the filters to temperatures of approximately 500° C. for a period of about 10 minutes. Regeneration of catalyzed soot filters requires heating the filters to temperatures of approximately 400° C. for a period of about 10 minutes. Desulfation of NOx adsorbers requires heating the catalysts to temperatures of approximately 700° C. for at least 5 minutes while operating the engine with a rich air/fuel mixture (excess fuel/no excess oxygen), that produces exhaust gas with higher concentrations of unburned hydrocarbons and carbon monoxide, and no oxygen. The prior art has proposed maintaining high catalyst temperatures by locating the catalyst components close to the engine turbocharger turbine outlet. This approach is not practical in on-highway vehicles due to space constraints.

The preferred way to perform a regeneration cycle is to heat the filter and catalyst components while the vehicle is at rest, for example, during a refueling stop. High exhaust temperatures are most effectively generated by loading the engine. However, it is difficult to adequately load an engine while a vehicle is at rest. The only loads on the engine when a vehicle is at rest are electrical loads such as those associated with lights and air conditioning systems and mechanical loads related to the operation of an air compressor, cooling fan and the idling torque load of the engine. These loads are negligible compared to the road loads encountered when a loaded vehicle is climbing a grade.

There is a need for an effective system for imposing a higher load on the engine when the vehicle is at rest thereby producing higher temperatures needed for regenerating exhaust system filter and catalyst components.

These and other problems are addressed by applicant's invention and summarized below.

SUMMARY OF THE INVENTION

According to one aspect of the present invention, a system for regenerating particulate filters and catalyst soot filters is provided for compression ignition engines. The system includes an integrated assembly comprising a starter, an alternator, a flywheel and a retarder. The system also includes a load bank heater disposed in the exhaust system. An engine control module is adapted to receive a signal for initiating a regeneration cycle when the vehicle is at rest and the engine is idling. In response to receiving the signal to initiate a regeneration cycle, the control module activates the load bank heater thereby applying a load to the engine. The engine control module also adjusts engine operating parameters.

The system also includes a sensor for sensing the temperature of the exhaust. When the sensor generates a signal indicating that the exhaust temperature is insufficient for regeneration, the load bank heater is activated. The load bank heater directly raises the temperature of the exhaust and also increases the load on the engine. Electrical energy derived from the integrated starter/alternator/flywheel/retarder assembly increases the load on the engine. In addition, the engine control module brings the engine to a specified operating speed.

The signal to initiate a regeneration cycle for a filter may be generated by a sensor that monitors exhaust back pressure in the exhaust. The signal to initiate a desulfation cycle of a NOx adsorber catalyst is initiated in response to signals received from exhaust NOx sensors, temperature sensors, air/fuel ratio sensors that are monitored by the engine control module during the desulfation cycle of a NOx adsorber catalyst. One engine operating parameter that is adjusted is the air/fuel ratio. Fueling and timing engine operating parameters can be adjusted by the engine control module for desulfation and regeneration.

A warning light may be activated in response to the engine control module receiving the signal to initiate a regeneration cycle. Upon activating the warning light, the engine control module may disable the engine unless an operator initiates the regeneration cycle. The operator is instructed by the warning light to activate the regeneration cycle by actuating a manual switch.

Referring to another aspect of the invention, a method of regenerating particulate filters, catalyzed soot filters and NOx adsorber catalysts for a vehicle having a compression ignition engine is provided. The compression ignition engine has an engine control module and an integrated starter/alternator/flywheel/retarder. The method comprises sensing the condition of the particulate filter, catalyzed soot filters, and NOx adsorber catalysts and generating an initiate cleaning cycle signal upon sensing that the filters or the catalysts require cleaning. Operation of the engine and the vehicle are monitored to determine whether the engine is idling and whether the vehicle is stopped, whereupon an engine idling/vehicle stop signal is generated. Upon receiving the initiate cleaning engine cycle signal and the engine idling/vehicle stop signal, the engine control module adjusts engine control parameters to bring the engine to a specified operating speed. The temperature of the exhaust gas stream is also sensed. Upon sensing that the exhaust gas temperature is insufficient for the regeneration of filters, a low temperature signal is generated. When the engine control module receives a low temperature signal, it activates a heater in the exhaust pipe that directly heats the exhaust gas. Activating the heater increases the load applied by the integrated starter/alternator/flywheel/retarder on the engine that also heats the exhaust gas.

The heater is a load bank heater that raises the temperature of the exhaust due to increasing the load on the engine applied by the integrated assembly.

According to other aspects of the method of the present invention, a signal to initiate a regeneration cycle is generated by a sensor that monitors exhaust gas pressure. A signal to initiate a desulfation cycle may be generated based upon outputs from exhaust NOx sensors, temperature sensors, and air/fuel ratio sensors that are received by the engine control module that in turn initiates desulfation of an NOx adsorber catalyst. The engine control module may also adjust the air/fuel ratio when desulfating a NOx adsorber catalyst. Fueling and timing may also adjust the air/fuel ratio engine operating parameters may be adjusted by the engine control module.

A warning light may be activated in response to the engine control module receiving the signal to initiate a regeneration cycle. Upon activating the warning light, the engine control module disables the engine unless an operator initiates the regeneration cycle. The operator actuates a manual switch to initiate a regeneration cycle upon activation of the warning light.

These and other aspects of the invention will be better understood in view of the attached drawings and the following detailed description.

BRIEF DESCRIPTION OF THE DRAWINGS

The drawing is a schematic representation of a compression ignition engine having an exhaust system component regeneration system made according to the present invention.

DETAILED DESCRIPTION OF THE PREFERRED EMBODIMENT(S)

Referring now to the drawing, a compression ignition engine 10 for an on-highway vehicle 12 is shown schematically. The engine 10 includes an engine control module 14 that controls operation of the engine 10 and also controls exhaust component regeneration and desulfation according to the present invention as described below.

Exhaust manifold sensors 16 and tail pipe sensors 18 provide information to the engine control module (ECM) 14 that is used in controlling exhaust component regeneration. The exhaust manifold sensors 16 may provide information regarding NOx levels, air/fuel ratios (λ), temperature, and pressure. More specifically, the exhaust manifold sensors 16 and pipe sensors 18 may provide information regarding NOx, λ, and temperature that enable the ECM to detect an impending need for regeneration. The ECM may also monitor other engine operating parameters to determine the need for regeneration. A warning light 26 is activated upon detecting a need for regeneration of a particulate filter 20, catalyzed soot filter 22, or NOx adsorber catalyst 24. Illumination of the warning light prompts the operator to actuate a switch 28 to activate the regeneration/desulfation cycle at the next fuel stop.

When the vehicle stops for fuel, the engine 10 normally continues to idle. At this time, with the vehicle stopped, the ECM controls fueling, timing, governing and other engine operating parameters as required to bring the engine to a specified operating speed. If an NOx adsorber catalyst is to be regenerated, the air/fuel ratio is also controlled accordingly.

If the exhaust temperature is insufficient for regeneration/desulfation, a heater load bank 30 having heating elements 32 is activated. Activating the heating elements 32 raises the exhaust temperature by directly heating the exhaust. In addition, activating the heater load bank 30 increases the load on the engine 10 because electrical energy used by the heating elements 32 is obtained from the combined starter/alternator/flywheel/retarder assembly 34. The load applied by the integrated starter/alternator/flywheel/retarder assembly to the engine 10 increases the load on the engine 10 that in turn increases the exhaust temperature. In this way, the heat of the exhaust gas stream is efficiently increased to levels necessary to regenerate particulate exhaust filters 20 and catalyst soot filters 22 and desulfate NOx catalysts 24.

If the operator fails during a subsequent fuel stop to initiate a regeneration/desulfation cycle after the warning light is illuminated, the ECM may disable the vehicle. The ECM can disable the vehicle by precluding gear engagement in the transmission or by disabling the engine throttle. The ECM may also take other measures to prevent operation of the vehicle until the regeneration/desulfation cycle is initiated by the operator. Alternatively, the system may activate an alarm or flash the warning light to provide further advice to the operator as to the necessity of performing the regeneration/desulfation cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of regenerating particulate filters, catalyzed soot filters, and NOx absorber catalysts for a vehicle having a compression ignition engine having an engine control module and an integrated starter/alternator/flywheel/retarder assembly, comprising:

sensing the condition of the particulate filters, catalyzed soot filters, and NOx absorber catalysts, and generating an initiate cleaning cycle signal upon sensing that the filters and catalysts require cleaning;

monitoring operation of the engine and the vehicle to determine whether the engine is idling and whether the vehicle is stopped and generating an engine idling/vehicle stopped signal;

receiving the initiate cleaning engine cycle signal and the engine idling/vehicle stopped signal by the engine control module;

initiating engine control parameter adjustments to bring the engine to a specified operating speed;

sensing the temperature of an exhaust gas stream and generating a low temperature signal upon sensing that the exhaust gas temperature is insufficient for regeneration of the filters;

generating a signal to initiate a desulfation cycle that is based upon outputs from an exhaust NOx sensor, an exhaust gas temperature sensor, and an air/fuel ratio sensor that are received by the engine control module that initiates desulfation of a NOx absorber catalyst; and activating a heater in the exhaust pipe in response to receiving the low temperature signal by the engine control module that directly heats the exhaust gas and also increases the load on the engine from the integrated starter/alternator/flywheel/retarder assembly that heats the exhaust gas.

2. The method of claim 1 wherein the heater is a load bank heater that raises the temperature of the exhaust in conjunction with increasing the load on the engine applied by the integrated assembly.

3. The method of claim 1 further comprising a signal to initiate a regeneration cycle generated by a sensor that monitors exhaust back pressure.

4. The method of claim 1 further comprising desulfating a NOx absorber catalyst by adjusting the air/fuel ratio.

5. The method of claim 1 wherein the engine operating parameters adjusted by the engine control module are fueling and timing parameters.

6. The method of claim 1 further comprising activating a warning light in response to the engine control module receiving the signal to initiate a regeneration cycle.

7. The method of claim 6 wherein upon activating the warning light, the engine control module disables the engine unless an operator initiates the regeneration cycle.

8. The method of claim 7 further comprising actuating a manual switch by the operator upon activation of the warning light.

9. A system for regenerating particulate filters, catalyzed soot filters, and NOx absorber catalysts for a compression ignition engine of a vehicle, comprising:

a starter;

an alternator;

a flywheel;

a retarder, wherein the starter, alternator, flywheel and retarder are combined as an integrated assembly;

a load bank heater disposed in an exhaust pipe; and an engine control module adapted to receive a signal to initiate a regeneration cycle, wherein the engine control module activates the load bank heater that applies a load to the engine and adjusts engine operating parameters after receiving the initiate regeneration cycle signal when the vehicle is at rest and the engine is idling, wherein the signal to initiate the regeneration cycle includes a desulfation cycle of a NOx absorber catalyst that is initiated in response to signals received from at least one exhaust NOx sensor, at least one exhaust gas temperature sensor, and at least one air/fuel ratio sensor by the engine control module.

10. The system of claim 9 wherein the exhaust gas temperature sensor generates a low temperature signal indicating that the exhaust temperature is below a predetermined level that is sufficient for regeneration, wherein the load bank heater is activated that raises the temperature of the exhaust in conjunction with increasing the load on the engine applied by the integrated assembly, wherein the engine control module brings the engine to a specified operating speed.

11. The system of claim 9 wherein the signal to initiate a regeneration cycle for a filter is generated by a sensor in the exhaust that monitors exhaust back pressure.

12. The system of claim 9 wherein during the desulfation cycle of a NOx absorber catalyst the engine operating parameter adjusted is the air/fuel ratio.

13. The system of claim 9 wherein the engine operating parameters adjusted by the engine control module are fueling and timing parameters.

14. The system of claim 9 wherein a warning light is activated in response to the engine control module receiving the signal to initiate the regeneration cycle.

15. The system of claim 14 wherein upon activating the warning light, the engine control module disables the engine unless an operator initiates the regeneration cycle.

16. The system of claim 15 wherein the operator activates the regeneration cycle by actuating a manual switch upon activation of the warning light.

* * * * *